(12) United States Patent
Iang

(10) Patent No.: US 8,734,751 B2
(45) Date of Patent: May 27, 2014

(54) METHOD AND APPARATUS FOR RECYCLING AND TREATING WASTES OF SILICON WAFER CUTTING AND POLISHING PROCESSES

(75) Inventor: Jr-Jung Iang, Changhua (TW)

(73) Assignee: Taiwan Water Recycle Technology Co., Ltd., Taichung (TW)

( * ) Notice: Subject to any disclaimer, the term of this patent is extended or adjusted under 35 U.S.C. 154(b) by 528 days.

(21) Appl. No.: 13/158,423

(22) Filed: Jun. 12, 2011

(65) Prior Publication Data
US 2012/0312747 A1    Dec. 13, 2012

(51) Int. Cl.
*C01B 31/36* (2006.01)

(52) U.S. Cl.
USPC .......... 423/349; 51/298; 51/307; 51/308; 203/31; 210/195.2; 210/638; 423/345; 423/348; 451/36; 451/87; 451/88; 494/13; 494/36

(58) Field of Classification Search
USPC ........... 51/298, 307, 308; 203/31; 210/195.2; 210/638; 423/345, 348, 349; 451/36, 87, 451/88; 494/13, 36
See application file for complete search history.

(56) References Cited

U.S. PATENT DOCUMENTS

| | | | | |
|---|---|---|---|---|
| 6,053,158 | A | * | 4/2000 | Miyata et al. .................. 125/21 |
| 6,161,533 | A | * | 12/2000 | Katsumata et al. ............. 125/21 |
| 2008/0250723 | A1 | * | 10/2008 | Fragiacomo ................... 51/298 |
| 2009/0293369 | A1 | * | 12/2009 | Gaudet et al. .................. 51/307 |
| 2010/0170161 | A1 | * | 7/2010 | Berndt et al. ................... 51/306 |
| 2010/0215561 | A1 | * | 8/2010 | Lan et al. ...................... 423/349 |
| 2011/0200521 | A1 | * | 8/2011 | Choi et al. .................... 423/657 |

* cited by examiner

*Primary Examiner* — Dirk Bass

(57) ABSTRACT

A method is provided for recycling and treating the wastes of silicon wafer cutting and polishing processes. To begin with, a dewatered filter cake is mixed with water so that the filter cake is diluted to form a working fluid. The water reacts with silicon in the filter cake to produce silicon dioxide and hydrogen. After the hydrogen is extracted for storage, specific gravity separation takes place via water so that silicon carbide and silicon particles are separated for sorting. Then, solid-liquid separation is performed on the remaining working fluid to separate silicon dioxide (solid) from water and PEG (liquid), before PEG is separated from water. Thus, the useful silicon particles, silicon carbide, silicon dioxide, and PEG are recycled from the filter cake to reduce the total amount of wastes. Moreover, as the side product, hydrogen, is of high commercial value, the method also adds value to recycling.

9 Claims, 4 Drawing Sheets

METHOD AND APPARATUS FOR RECYCLING AND TREATING WASTES OF SILICON WAFER CUTTING AND POLISHING PROCESSES

BACKGROUND OF THE INVENTION

1. Technical Field

The present invention relates to a method and apparatus for treating silicon wafer wastes. More particularly, the present invention relates to a method and apparatus for recycling and treating the wastes of silicon wafer cutting and polishing processes so as to add value to products and effectively solve environmental pollution problems.

2. Description of Related Art

Cutting silicon ingots into silicon wafers (chips) of uniform thickness has been a standard process in the semiconductor chip and solar panel industries. The cutting process typically involves a special metal wire saw as the cutting tool and the high-hardness silicon carbide (SiC) as the abrasive. In addition, a mineral oil such as polyethylene glycol (PEG), diethylene glycol (DEG), or propylene glycol (PG) is used as the cutting and cooling fluid. When the metal wire saw moves back and forth at high speed, silicon carbide acts as a medium for enhancing the cutting performance of the wire saw so that silicon chips can be effectively cut. During the cutting process, the PEG-based cutting fluid is introduced to the portion being cut not only for cooling and lubricating purposes, but also to bring the silicon particles and impurities generated by cutting out of the cutting grooves, thereby ensuring a smooth and continuous wafer cutting process and facilitating subsequent procedures.

While silicon wafers are being cut and polished, the cutting fluid introduced to the cutting area is continuously discharged, after use, from the cutting area to carry away the silicon particles, impurities, and ground silicon carbide generated by cutting. Thus, a waste oil slurry of high particle concentration and high turbidity is produced. Traditionally, most of the silicon wafer cutting factories either dispose of the useless oil slurry as waste or burn it with heavy oil and then bury the ashes. In either case, however, a waste treatment company must be hired, which is costly. In addition, incineration of the waste oil slurry generates considerable carbon dioxide and is therefore environmentally unfriendly. Hence, neither incineration nor landfill treatment is an ideal solution to the waste oil slurry generated from the silicon wafer cutting and polishing processes.

Presently, attempts are being made to recycle the cutting oil from the waste oil slurry by means of filtering equipment, in which solid-liquid separation is typically carried out using applicable membrane techniques. This approach, though capable of reclaiming some of the oil for reuse in the silicon wafer cutting and polishing processes, still produces a huge amount of sludge, or better known as "filter cake". The sludge contains silicon carbide, silicon particles, and PEG that are recyclable and reusable, but is nevertheless buried as waste, raising environmental protection issues too. Moreover, it is cost-ineffective to reclaim the oil simply by solid-liquid separation. This is mainly because the waste oil slurry is filtered through membranes without proper pre-treatment, so the pores of the membranes tend to be clogged. As a result, the operating cycles of the membranes are shortened, and the associated costs increased.

Besides, driven by the recent rigorous development of the solar energy industry, the demand of silicon carbide, which was formerly used as a consumable, greatly outstrips supplies. In consequence, the use of PEG for lubricating and cooling purposes also rises significantly, making PEG expensive. Therefore, in consideration of costs and environmental protection, it is necessary not only to recycle oil from the waste oil slurry, but also to separate and recycle the useful silicon carbide and silicon particles from the filter cake, with a view to reducing the total amount of wastes, minimizing pollution, and lowering waste disposal costs.

Now that no treatment methods so far are capable of reaching a balance between recycling costs and environmental protection while featuring efficient and low-cost operation, the silicon wafer cutting industry is facing higher and higher pollution prevention costs. It is therefore imperative for members of the industry to not only increase product quality but also improve pollution prevention techniques so that both economic and environmental protection goals can be met, production costs lowered, and industrial competitiveness enhanced.

BRIEF SUMMARY OF THE INVENTION

It is an objective of the present invention to provide a method for recycling and treating the wastes of silicon wafer cutting and polishing processes, wherein the method reduces the generation of wastes, features relatively low recycling costs, effectively solves environmental pollution problems, and can separate the recyclable oil, silicon carbide, and like side products from wastes.

A secondary objective of the present invention is to provide an apparatus for recycling and treating the wastes of silicon wafer cutting and polishing processes, wherein the apparatus is less susceptible to membrane clogging than the prior art. Thus, the membrane service life is extended to increase recycling and treatment efficiency.

According to the present invention, a method for recycling and treating the wastes of silicon wafer cutting and polishing processes includes the following steps.

Step (A): A filter cake which is dewatered in advance is put into a treatment tank. The filter cake, formed by filter-pressing a waste oil slurry, at least contains silicon (Si) particles, silicon carbide (SiC), and a residual cutting fluid composed essentially of polyethylene glycol (PEG).

Step (B): A reactant is added into the treatment tank and mixed with the filter cake so that the filter cake is diluted and forms a working fluid. The silicon particles and the reactant in the working fluid undergo a catalyst reaction and thereby produce solid silicon dioxide ($SiO_2$) and hydrogen gas ($H_2$).

Step (C): The hydrogen is drawn from within the treatment tank to a gas storage tank for storage in the compressed state.

Step (D): By means of specific gravity separation, silicon carbide and the remaining silicon particles are separated from the working fluid (whose slurry concentration has been diluted) for sorting and recycling.

Step (E): The working fluid from which silicon particles and silicon carbide have been separated is filtered through membranes for solid-liquid separation. Thus, the working fluid is separated into solid silicon dioxide and a liquid of water and PEG Step (F): The liquid of water and PEG is treated by reverse osmosis to produce reusable water and a reclaimed cutting fluid which is composed essentially of PEG.

To sum up, according to the present invention, a filter cake is mixed with a water-based catalyst so as to be diluted and form a working fluid. As the catalyst reacts with the silicon particles in the working fluid, a catalyst reaction takes place and generates silicon dioxide and hydrogen. After the hydrogen is extracted and recycled, specific gravity separation is conducted by means of water so as to separate silicon carbide and the remaining silicon particles from the working fluid. Then, solid-liquid separation is carried out to separate the working fluid into solid silicon dioxide and a liquid of water and PEG. The liquid of water of PEG is further separated into water and PEG. Once the useful silicon particles, silicon carbide, silicon dioxide, and PEG are recycled from the waste sludge (i.e., filter cake) formed by a former recycling process, the total amount of wastes is reduced to ease the problem of waste burial. Further, the side product, hydrogen, is of high commercial value. Therefore, the present invention not only saves energy and reduces wastes, but also adds value to recycling.

BRIEF DESCRIPTION OF THE SEVERAL VIEWS OF THE DRAWINGS

The invention as well as a preferred mode of use, further objectives, and advantages thereof will be best understood by referring to the following detailed description of an illustrative embodiment in conjunction with the accompanying drawings, in which.

DETAILED DESCRIPTION OF THE INVENTION

Figure 1:
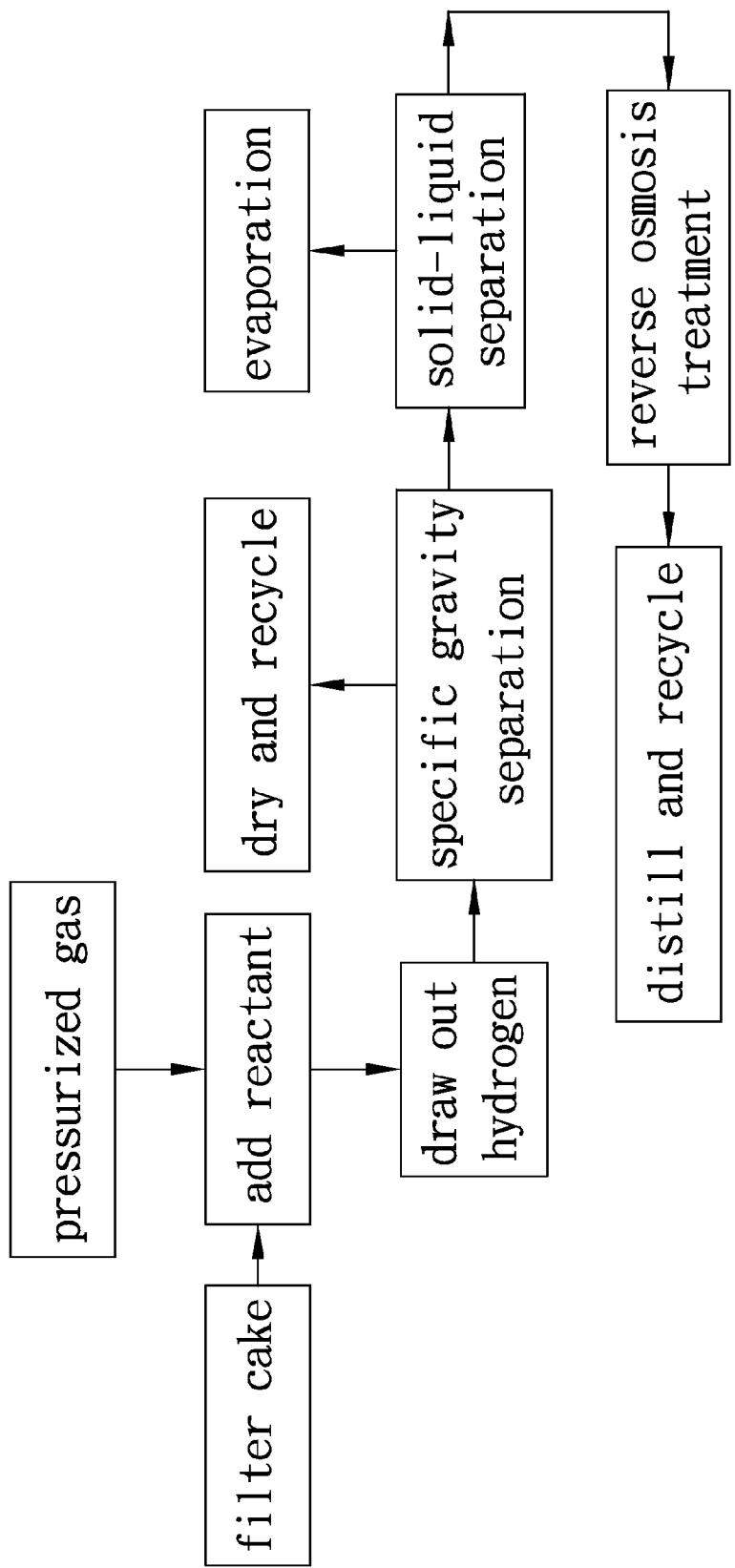
FIG. 1 is a block diagram illustrating the process flow of a method according to the present invention for recycling and treating the wastes of silicon wafer cutting and polishing processes.
Figure 2:
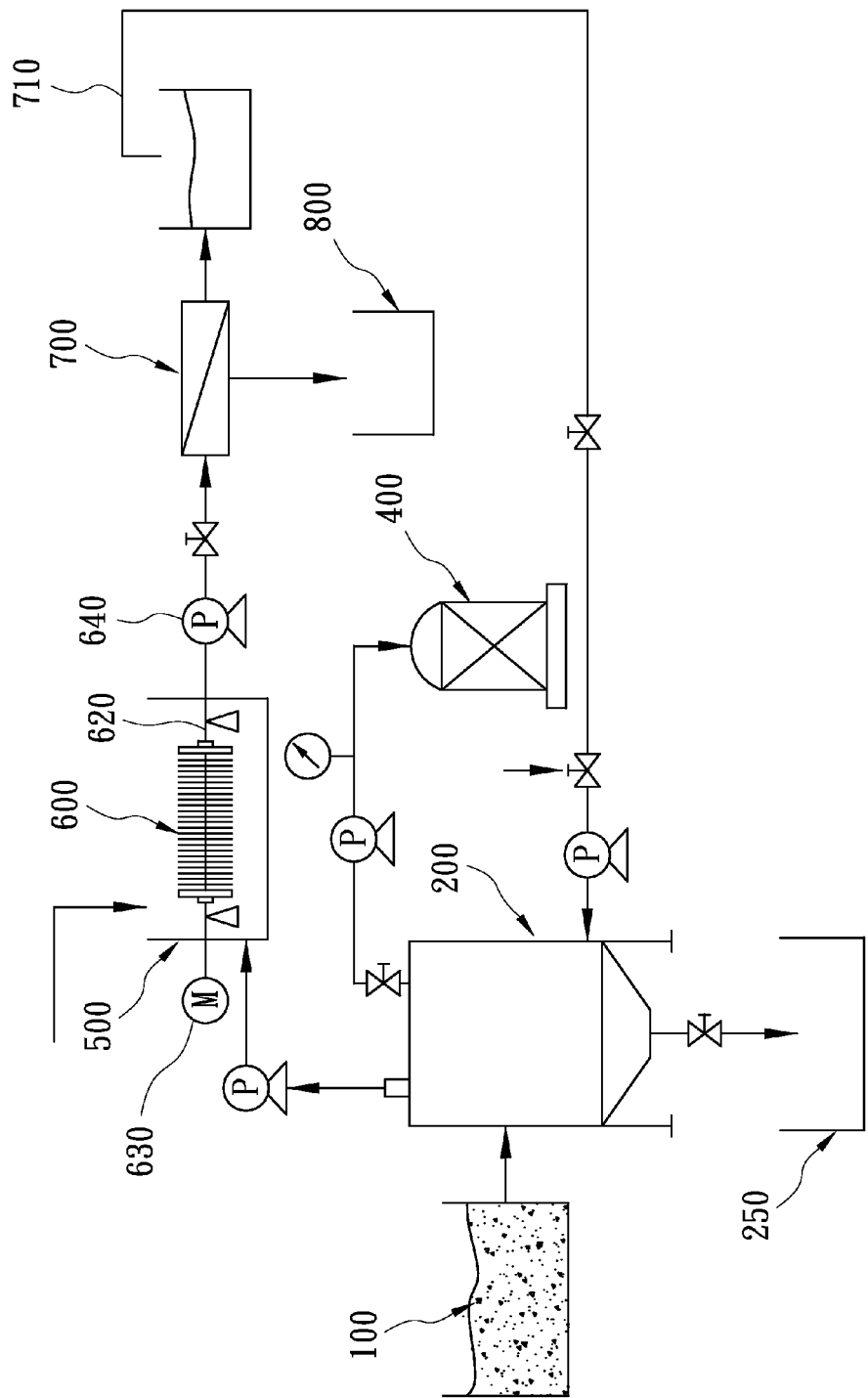
FIG. 2 is a schematic system diagram illustrating the general layout of a recycling system for treating a filter cake according to the present invention.
Figure 3:
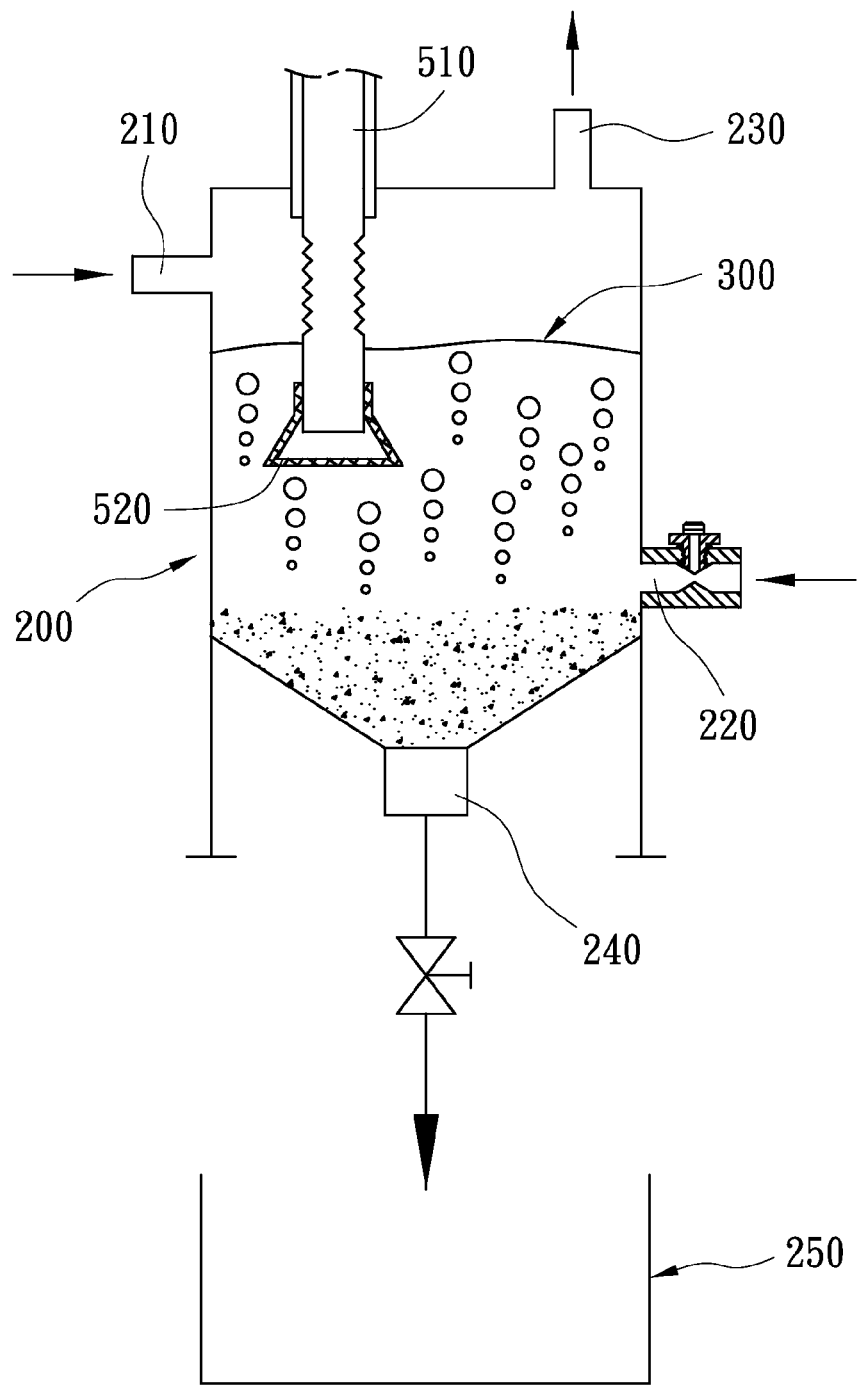
FIG. 3 is a partial sectional view of the inner structure of a filter tank according to the present invention.

Referring to FIG. 1 to FIG. 3, in one embodiment of the present invention, a method for recycling and treating the wastes of silicon wafer cutting and polishing processes includes the following steps.

Step (A): A filter cake 100 which is dewatered in advance by filter-pressing is put into a treatment tank 200 through a feeding hole 210 thereof. The treatment tank 200 is a closed container. The filter cake 100 is formed by applying a primary filter-pressing process to the waste oil slurry (hereinafter referred to also as wafer cutting waste) generated from the silicon wafer cutting and polishing processes. The filter cake 100 at least contains silicon (Si) particles, silicon carbide (SiC), and a residual cutting fluid whose main component is polyethylene glycol (PEG).

In this embodiment, the wafer cutting waste is dewatered by a plate-frame filter press. The filter plates in the filter press intercept most of the solids in the wafer cutting waste, and the solids thus intercepted are compressed by high-pressure air to form a sludgy filter cake. In addition to silicon particles, silicon carbide, and impurities, the filter cake contains a residual amount of the PEG-based oily cutting fluid. The present invention is directed to retreating, recycling, and packaging the aforementioned compositions of the filter cake 100.

Step (B): A reactant is pumped into the treatment tank 200. In this embodiment, the reactant is preferably a water-containing liquid. More preferably, this liquid contains a small amount of tiny bubbles so that the sludgy filter cake 100, after being diluted by the reactant, becomes a working fluid 300 with bubbles and solids. The tiny bubbles can be generated by the Venturi effect, i.e., by mixing liquid and gas in advance and pumping the mixture into the treatment tank 200. Thus, not only are the liquid and the filter cake 100 stirred at relatively high speed to promote chemical reaction, but also the relatively light-weight residual oil (e.g., PEG) and impurities are lifted to the surface layer of the fluid by the buoyancy of the bubbles to facilitate subsequent separation. Therefore, after a predetermined time elapses, the reactant and the silicon particles in the working fluid 300 undergo a catalyst reaction and gradually generate solid silicon dioxide ($SiO_2$) and hydrogen gas ($H_2$). The foregoing chemical reaction can be represented by:

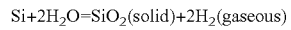

$$Si+2H_2O=SiO_2(solid)+2H_2(gaseous)$$

In the present embodiment, the reactant is pumped into the treatment tank 200 through an aeration hole 220 at a lower portion of the treatment tank 200. In addition, the liquid/bubble ratio in the reactant is preferably 3:1. Furthermore, the fluid surface of the working fluid 300 is slightly lower than the feeding hole 210 to provide a space where the hydrogen gas can be temporarily kept.

Step (C): After the predetermined time, the hydrogen kept in the upper portion of the treatment tank 200 is extracted through a vent hole 230 into a gas storage tank 400 so as to be stored in the compressed state. The hydrogen can be packaged for sale and reused as a heat source.

Step (D): As the specific gravities of silicon particles and silicon carbide are both higher than that of water (Si: 2.3, SiC: 3.2), the remaining silicon particles and silicon carbide are separated from the working fluid 300 by specific gravity separation after hydrogen is drawn out of the treatment tank 200. In this embodiment, solid silicon carbide and silicon particles fall sequentially on the bottom of the treatment tank 200 and are discharged into a sieving tank 250 through a discharge hole 240 at the bottom of the treatment tank 200. Then, the discharged silicon carbide and silicon particles are dried so as to be sorted and recycled.

Step (E): The working fluid 300 from which silicon particles and silicon carbide have been separated is drawn to a filter tank 500 for solid-liquid separation. In this embodiment, the filter tank 500 has a telescoping tube 510 which extends into the treatment tank 200 from outside. The bottom end of the telescoping tube 510 is connected with a conical sucker 520 which is movable along with the fluid level of the working fluid 300. The opening at the bottom end of the sucker 520 is provided with a fine mesh screen (not shown) through which water, silicon dioxide, and PEG are drawn from the working fluid 300 to the filter tank 500.

Figure 4:
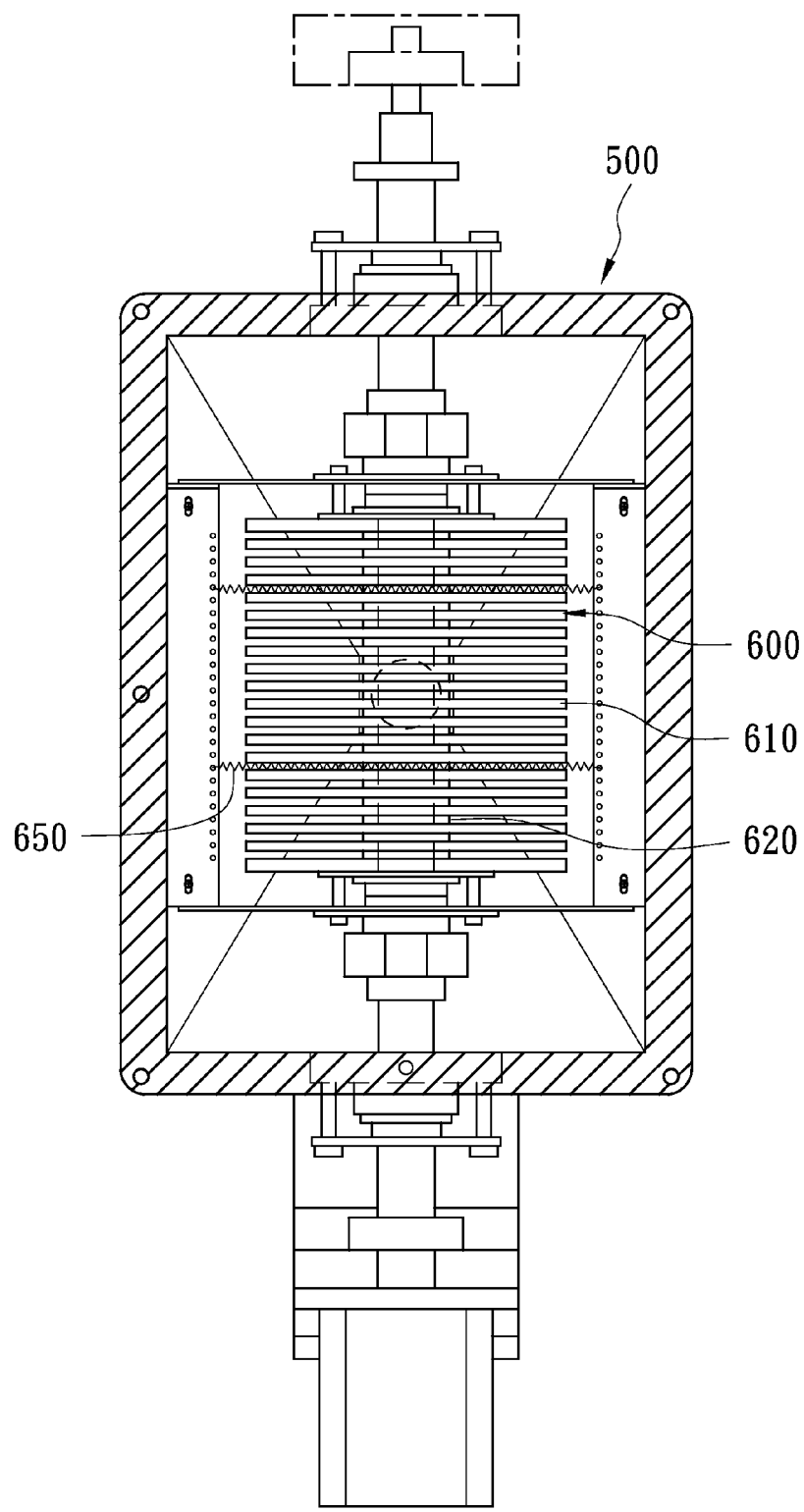
FIG. 4 is a partial sectional view of a disk-shaped ultrafiltration (UF) membrane filter device according to the present invention.

The filter tank 500 is provided therein with a semi-submerged solid-liquid separation unit 600. Preferably, the solid-liquid separation unit 600 uses disk-shaped ultrafiltration (UF) membranes as shown in FIG. 4 and is configured as follows. A plurality of UF membranes 610 are mounted in series around a horizontal and pivotable liquid collection tube 620. A motor 630 is provided outside the filter tank 500 to drive the UF membranes 610 into rotation about an axis defined by the liquid collection tube 620. An oil pump 640 is provided on the downstream side of the filter tank 500 and is configured to draw out the liquid that has flown into the liquid collection tube 620 through the UF membranes 610. By negative-pressure suction of the oil pump 640, a liquid composed of the water and PEG in the working fluid 300 is filtered through the UF membranes 610, drawn out of the filter tank 500, and collected. Meanwhile, the solid silicon dioxide and other tiny solids (e.g., impurities) are retained in the filter tank 500. The concentration of the solid particles in the filter tank 500 will increase continuously so that the silicon dioxide and the impurities can be recycled by evaporation followed by drying, so as to be reused as a secondary construction material (e.g., for making ordinary bricks, interior partitions, or paving bricks). Thus, the working fluid 300 is separated into solid silicon dioxide and a liquid of water and PEG.

In this step, in order to extend the operating cycle of the UF membranes 610, each UF membrane 610 can be attached with a scraping element 650. The scraping elements 650 are configured to scrape off the muddy deposit on the membrane surfaces automatically while the UF membranes 610 are rotated. By removing the slime accumulated on the membrane surfaces, the UF membranes 610 are prevented from clogging, and the filter speed from lowering.

Step (F): The liquid of water and PEG goes through a reverse osmosis (RO) filter unit 700 for reverse osmosis treatment, wherein the RO filter unit 700 may use either nanofiltration (NF) membranes or RO membranes. In the present embodiment, the RO membranes are used. The RO membranes, which only allow water molecules to pass through the membrane pores, separate water from condensed PEG and thus produce reclaimed water and an oily fluid composed mainly of PEG. The reclaimed water can be guided through a return water pipe 710 into the treatment tank 200 and used in step (B) as the reactant in the catalyst reaction with the silicon particles, thereby reducing the water demand of the treatment tank 200.

Step (G): The aforesaid oily fluid, which is composed mainly of PEG is distilled to remove water and waste oil therefrom. Thus, a condensed PEG is obtained. After being tested by a turbidimeter, the condensed PEG is delivered to an oil storage tank 800 as reclaimed oil. The reclaimed oil can be packaged for use in wafer cutting and polishing processes.

In a nutshell, the present invention mixes a water-based catalyst with the filter cake 100 (i.e., waste sludge) which has been dewatered by filter-pressing. As a result, the filter cake 100 is diluted to form the working fluid 300, which has a reduced slurry concentration. Then, a catalyst reaction takes place between the catalyst and the silicon particles in the working fluid 300 and produces solid silicon dioxide and hydrogen gas. After the hydrogen is extracted and recycled, specific gravity separation is conducted by way of water so that silicon carbide and the remaining silicon particles are separated from the working fluid 300 and then sorted. Following that, the UF membranes 610 are used for solid-liquid separation, whereby the working fluid 300 is separated into solid silicon dioxide and a liquid of water and PEG Finally, the PEG is separated from water by the RO membranes. Thus, by treating the waste sludge generated from a former recycling process, the useful silicon particles, silicon carbide, silicon dioxide, and PEG are recycled to reduce the total amount of wastes and ease the problems associated with waste burial. Moreover, as the side product, hydrogen gas, has high commercial value, the present invention not only saves energy and reduces wastes, but also adds value to recycling.

Compared with the conventional approaches to treating the wastes of silicon wafer cutting and polishing processes, the present invention has the following advantageous effects:

1. According to the present invention, the otherwise untreatable waste filter cake 100 (sludge) is added with water so that hydrogen is generated from a catalyst reaction. After silicon carbide and silicon particles are separated by specific gravity separation, silicon dioxide, water, and PEG are further separated from the working fluid 300 through the UF membranes 610 and the RO membranes. Thus, hydrogen, silicon particles, silicon carbide, silicon dioxide, water, and PEG are recycled for use. The present invention adds value to recycling, reduces the amount of post-treatment wastes (e.g., sludge), and thereby achieves the objectives of energy saving and waste reduction simultaneously.

2. According to the present invention, solid-liquid separation takes place after the solid silicon carbide and silicon particles are separated through specific gravity separation to thereby reduce the concentration of solids in the working fluid 300. Hence, the clogging of the UF membranes 610 by slime accumulation and the polarization of the concentration of the working fluid 300 can be effectively delayed when solid-liquid separation is carried out. As a result, the membrane service life is extended, and the operation costs reduced.

3. According to the present invention, the disk-shaped UF membranes 610 for solid-liquid separation can be scraped while they are rotated, thus substantially reducing the chances of slime accumulation on the membrane surfaces and the formation of filter cake. Therefore, not only are the service lives of the membranes increased, but also the overall recycling and treatment efficiency is enhanced. In other words, the present invention is advantageous in terms of both recycling efficiency and recycling costs.

The embodiment described above is provided by way of example only and is not intended to limit the scope of the present invention. Therefore, all equivalent changes or modifications which are based on the technical contents disclosed herein and easily conceivable by a person skilled in the art should fall within the scope of the present invention as set forth in the appended claims.

What is claimed is:

1. A method for recycling and treating wastes of silicon wafer cutting and polishing processes, the method comprising:
    step (A): putting a filter cake which is dewatered in advance into a treatment tank, wherein the filter cake is formed by filter-pressing a waste oil slurry generated from the silicon wafer cutting and polishing processes and at least contains silicon (Si) particles, silicon carbide (SiC), and a residual cutting fluid composed mainly of polyethylene glycol (PEG);
    step (B): adding a reactant into the treatment tank so that the filter cake is mixed with and diluted by the reactant to form a working fluid, in which the silicon particles and the reactant undergo a catalyst reaction to generate solid silicon dioxide ($SiO_2$) and gaseous hydrogen ($H_2$);
    step (C): drawing the hydrogen from within the treatment tank to a gas storage tank for pressurized storage;
    step (D): separating, by specific gravity separation, remaining said silicon particles and the silicon carbide from the working fluid, which has a diluted slurry concentration, so as for the remaining silicon particles and the silicon carbide thus separated to be sorted and recycled;
    step (E): performing solid-liquid separation, by way of membrane filtering, on the working fluid from which the remaining silicon particles and the silicon carbide have been separated, thereby separating the working fluid into the solid silicon dioxide and a liquid of water and PEG; and
    step (F): applying a reverse osmosis (RO) treatment to the liquid of water and PEG, so as to obtain reusable water and a reclaimed cutting fluid composed mainly of PEG.

2. The method of claim 1, wherein the reactant added in step (B) is water.

3. The method of claim 1, wherein the solid-liquid separation in step (E) is implemented by disk-shaped ultrafiltration (UF) membranes.

4. The method of claim 1, further comprising the step, performed after step (F), of introducing the water obtained from the reverse osmosis treatment into the treatment tank so that the water is used in step (B) as a catalyst.

5. The method of claim 1, further comprising the step, performed after step (F), of distilling the reclaimed cutting fluid, which is composed mainly of PEG, so as to remove residual water and waste oil from the reclaimed cutting fluid and thus produce reusable reclaimed oil.

6. The method of claim 1, wherein the reverse osmosis treatment in step (F) is implemented by reverse osmosis membranes or nanofiltration (NF) membranes.

7. The method of claim 1, wherein step (B) further comprises pumping a pressurized gas into the treatment tank so that the pressurized gas is mixed with the working fluid.

8. The method of claim 1, further comprising the step, performed after step (D), of drying the remaining silicon particles and the silicon carbide which are separated from the working fluid, so as to facilitate sorting, packaging, and recycling.

9. The method of claim 1, wherein the liquid of water and PEG is drawn out of the working fluid in step (E) by negative-pressure suction.

* * * * *